UNITED STATES PATENT OFFICE.

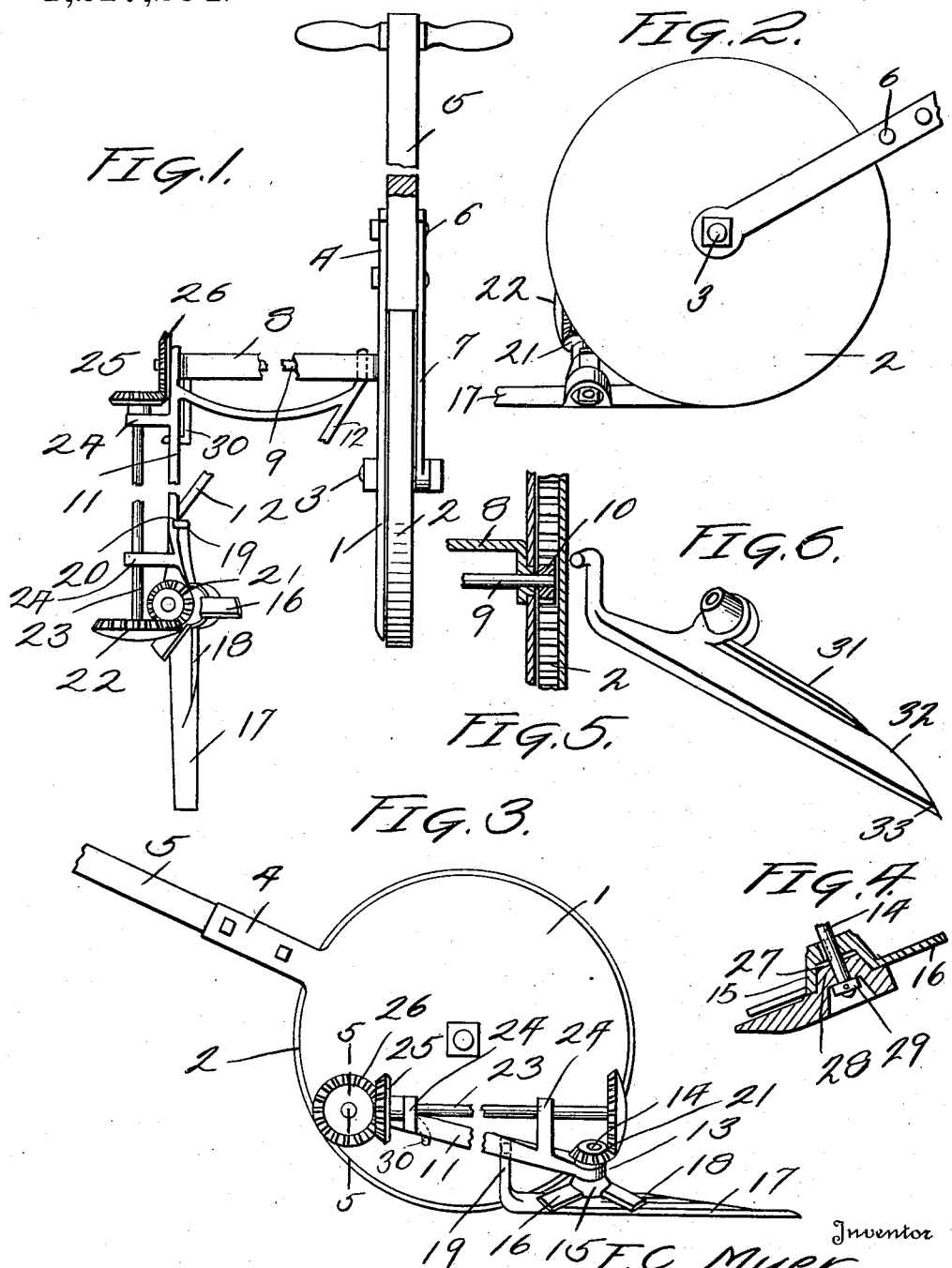

FRED C. MYER, OF PORT JERVIS, NEW YORK.

LAWN-TRIMMER.

1,217,204. Specification of Letters Patent. Patented Feb. 27, 1917.

Application filed June 9, 1916. Serial No. 102,683.

*To all whom it may concern:*

Be it known that I, FRED C. MYER, a citizen of the United States, residing at Port Jervis, in the county of Orange, State of New York, have invented certain new and useful Improvements in Lawn-Trimmers; and I do hereby declare the following to be a full, clear, and exact description of the invention, such as will enable others skilled in the art to which it appertains to make and use the same.

This invention relates to a lawn trimmer.

An object of the invention resides in the provision of a device for cutting the grass along the edges of the lawn adjacent driveways, walks and flower beds.

A further object of the invention resides in so constructing the device that where the surfaces of the driveways, walks or flower beds are below the surface of the lawn the cutting elements of the device will drop below the surface of the lawn so as to successfully trim the edges.

A still further object of the invention resides in so constructing the device that it will be exceedingly simple to operate.

With these and other objects in view, such as will appear as my description progresses, my invention comprises the combination and arrangement of parts as set forth in and falling within the scope of the appended claims.

In the drawing:

Figure 1 is a plan view of a device constructed in accordance with my invention;

Fig. 2 is a side elevation thereof looking at the side on which the drive wheel is mounted;

Fig. 3 is a similar view looking from the opposite side;

Fig. 4 is a sectional view of the cutter and blade;

Fig. 5 is a similar view on line 5—5 of Fig. 3, and

Fig. 6 is a detail of a blade with a curved forward end.

In the drawing, I have illustrated my device as consisting of a frame which includes a circular plate 1 having an internal gear wheel 2 mounted thereon, the wheel being supported by an axle 3 which extends from the plate. This plate 1 is provided with an extension 4 to which a handle 5 is secured by means of bolts 6. A supporting strip 7 is secured to the handle 5 by the bolts 6 and is provided at its opposite end with an aperture through which the axle 3 extends. Extending at right angles to the plate 1 is an arm 8 having depending portions in which registering openings are formed. Extending through these openings is a shaft 9 on one end of which is a gear 10, which gear is located within and meshes with the teeth of the internal gear 2.

Pivotally mounted on the shaft 9 is a bar 11 having brace bar 12 formed integral therewith and having on its end remote from its pivot point a bearing 13 for a purpose which will later appear. A stub shaft 14 is mounted in this bearing 13 and secured to this stub shaft is a knife 15 which includes a plurality of cutting blades 16 extending in angular relation to each other and radiating from a common center. Mounted on the stub shaft 14 is a blade 17 which is provided with a cutting edge 18 and with an angularly extending finger 19 which projects into an aperture 20 in the bar 11. The stub shaft 14 passes loosely through the knife 17 so that it may rotate with relation to the knife. The forward end of this blade 17 is square and rides flat upon the ground so that the grass blades will be guided between the blades 16 of the knife 15 and the cutting edge 18 of the blade 17.

In order that this stub shaft 14 may be rotated to actuate the knife, I have secured to the shaft 14, a beveled gear 21, which meshes with a similar gear 22 on a shaft 23 which latter shaft is supported in bearings 24 formed on the bar 11. A beveled gear 25 is secured to the opposite end of this shaft 23 and meshes with a similar gear 26 on the shaft 9. Thus as the device is advanced the gear wheel 2 will actuate the gear 10 and through the shafts 9 and 23 and the gears thereon will impart motion to the gear 21 and the stub shaft 14 so that the knife 15 will be rotated and the blades 16 thereof will successively pass the cutting edge 18 of the blade 17 and cut the grass. It is to be noted that the knife 15 is provided with a frusto-conical chamber 27 into which a frusto-conical projection 28 of the blade 17 extends so that the projection 28 may be forced into the chamber 27 by the nut 29 by means of which the blade 17 is held upon the shaft 14. Thus the distance between the cutting edge 18 and the knife 15 may be varied.

Extending outwardly from the arm 8 is a finger 30 which extends beneath the bar 11 and limits its downward movement. This finger is provided so that the operator may, by moving the handle downwardly, lift the cutting mechanism from the ground. The pivoting of the bar 11 permits the same to swing below the surface of the lawn when the edge of a flower bed, driveway or walk, the surfaces of which are below the surface of the lawn, are being trimmed.

In the modification of the blade which co-operates with the cutting knife, shown in Fig. 6 of the drawing, the body of the blade, which is provided with a cutting edge 31 extends in a plane and the edge extending from the cutting edge is curved as at 32 forming a point 33. The construction of the blade in this manner assists materially in the cutting of the lawn around circular beds or driveways.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In a lawn trimmer, the combination with a frame, of a drive wheel mounted thereon, the said wheel having an internal gear, a shaft mounted on the frame and having a gear meshing with the said internal gear, a bar pivotally mounted on the shaft, cutting mechanism mounted on the bar and means for transmitting motion from the shaft to the cutting mechanism.

2. In a lawn trimmer, the combination with a shaft and a support therefor, of a bar pivotally mounted on the shaft, a stub shaft mounted on said bar, a cutting knife secured to the stub shaft, a cutting blade loosely mounted on the stub shaft adjacent the cutting knife in such a manner that the shaft may rotate with relation to the blade, means for varying the distance between the cutting blade and knife, a gear on the first mentioned shaft, a gear on the stub shaft, a shaft having gears on the ends thereof meshing with the last mentioned gears, and means for actuating the first mentioned shaft.

In testimony whereof, I affix my signature, in the presence of two witnesses.

FRED C. MYER.

Witnesses:
W. W. FAIRCHILD,
DON R. WELLER.

Copies of this patent may be obtained for five cents each, by addressing the "Commissioner of Patents, Washington, D. C."